United States Patent
Liu

(10) Patent No.: US 10,586,213 B2
(45) Date of Patent: Mar. 10, 2020

(54) MOBILE WIRELESS DEVICE WITH ENHANCED LOCATION FEATURE

(71) Applicant: Jack Yung-Kung Liu, Westford, MA (US)

(72) Inventor: Jack Yung-Kung Liu, Westford, MA (US)

(73) Assignee: Public Partnerships LLC, Boston, MA (US)

( * ) Notice: Subject to any disclaimer, the term of this patent is extended or adjusted under 35 U.S.C. 154(b) by 128 days.

(21) Appl. No.: 15/099,849

(22) Filed: Apr. 15, 2016

(65) Prior Publication Data
US 2018/0197148 A1    Jul. 12, 2018

(51) Int. Cl.
G06Q 10/10    (2012.01)
H04W 4/029    (2018.01)
G01S 19/48    (2010.01)

(52) U.S. Cl.
CPC .......... *G06Q 10/1091* (2013.01); *G01S 19/48* (2013.01); *H04W 4/029* (2018.02)

(58) Field of Classification Search
CPC ..... H04W 4/023; H04W 4/025; H04W 4/029; H04W 4/02; H04W 4/026; H04W 4/027; G01S 19/48; G01S 19/13; G01S 19/46
See application file for complete search history.

(56) References Cited

U.S. PATENT DOCUMENTS

| | | | |
|---|---|---|---|
| 2014/0279672 A1* | 9/2014 | Liu | G06Q 10/10 705/345 |
| 2016/0044630 A1* | 2/2016 | Markhovsky | H04W 64/006 455/456.6 |
| 2017/0164315 A1* | 6/2017 | Smith | H04W 4/029 |

* cited by examiner

*Primary Examiner* — Diane D Mizrahi
(74) *Attorney, Agent, or Firm* — Anthony L. Miele; Miele Law Group

(57) ABSTRACT

One or more in-range stationary stations are provided which are configured to transmit a signal received by an in-range mobile unit. An application is run on the in-range mobile unit, and, when run, comprises a destination input configured to present a destination graphical user input on a display screen of the in-range mobile unit along with information to thereby prompt a user to input textual information which the application receives and then uses to populate a set of geographic address fields representing a destination premises address. The application when run further includes calls to location services APIs, the calls including calls to cause an acquisition of a current location determination. The application converts the destination premises address to a destination geographic location using the same parameters used to represent the current location determination. The application when run provides an indication of the determined location of the in-range mobile unit in terms of a premises address. The current determined location is set to the destination premises address when a straight line distance between the destination geographic location and the acquired current location determination is less than a prescribed value.

33 Claims, 1 Drawing Sheet

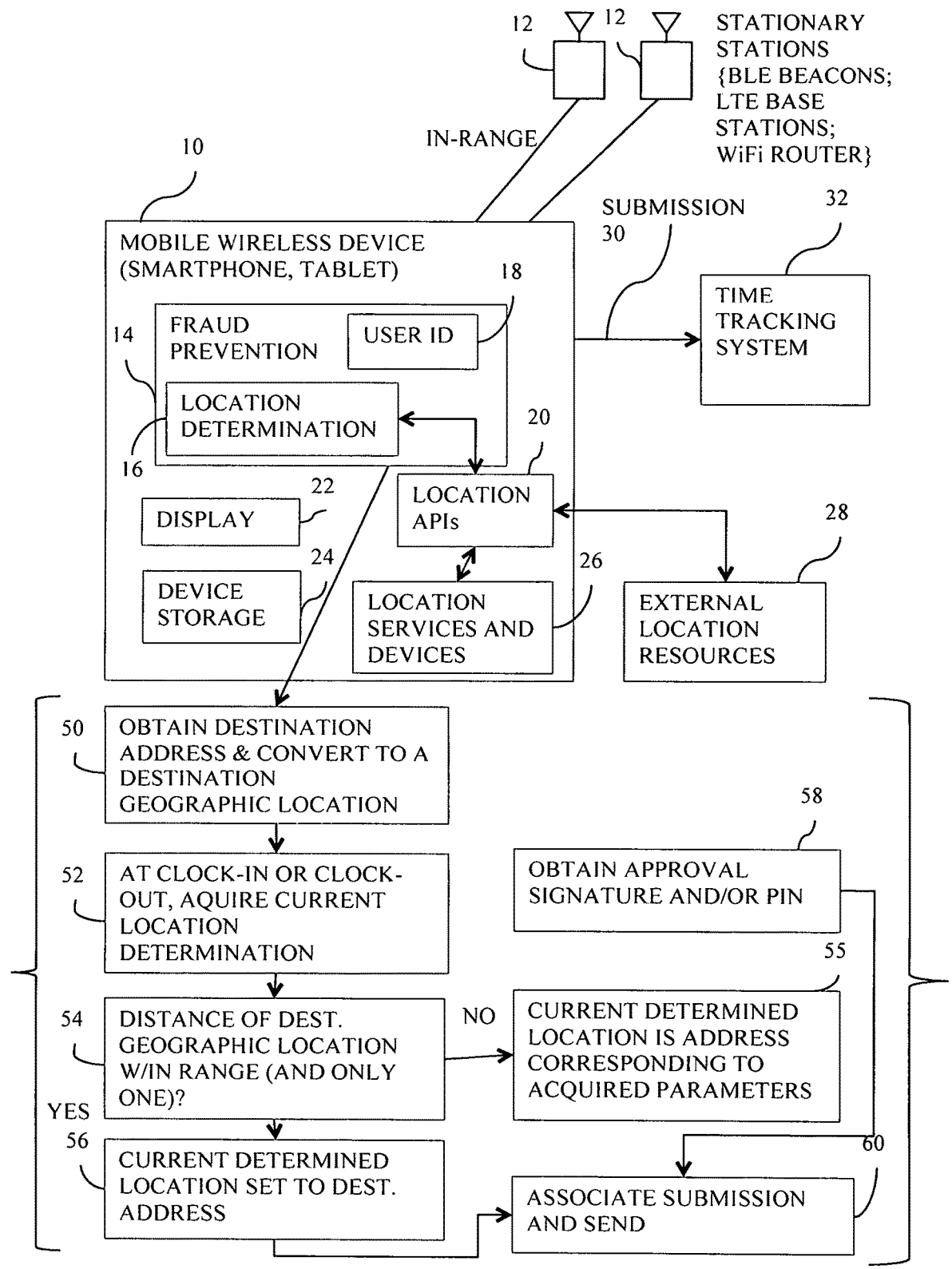

US 10,586,213 B2

MOBILE WIRELESS DEVICE WITH ENHANCED LOCATION FEATURE

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the disclosure relate to a communications system for acquiring data such as work time information. Other aspects relate to fraud prevention technologies. Still other aspects relate to technologies for locating mobile devices.

BACKGROUND

Mobile devices, e.g., smartphones and tablets, are being equipped with more sophisticated mechanisms to acquire data about users. With certain data acquisition systems, e.g., in systems for tracking work hours, features are also provided to prevent fraudulent data entry and determine the geographic location of the user at the time of data entry.

BRIEF DESCRIPTION OF THE DISCLOSURE

The invention may be directed to apparatus, a method, system, or device, or computer-readable media. Per one aspect of the disclosure, one or more in-range stationary stations are provided which are configured to transmit a signal received by an in-range mobile unit. The in-range mobile unit contains local location resources, including a GNSS (Global Navigation Satellite Systems) location portion and a non-GNSS location portion. Location storage is provided on the in-range mobile unit, which holds location information in accordance with a location information modeling format. Location services APIs (Application Programming Interfaces) are contained in the in-range mobile unit, and configured to communicate between an application on the mobile unit on the one hand and the local location resources on the other hand. The application is configured to be run on the in-range mobile unit, and, when run, comprises a destination input configured to present a destination graphical user input on a display screen of the in-range mobile unit along with information to thereby prompt a user to input textual information which the application receives and then uses to populate a set of geographic address fields representing a destination premises address. The application when run further includes calls to the location services APIs, the calls including calls to cause an acquisition of a current location determination from the non-GNSS location portion of the local location resources. The application when run converts the destination premises address to a destination geographic location using the same parameters used to represent the current location determination. The application when run provides an indication, to the in-range mobile unit's user via the unit's visual display, of the determined location of the in-range mobile unit in terms of a premises address, the current determined location being set to the destination premises address when a straight line distance between the destination geographic location and the acquired current location determination is less than a prescribed value.

BRIEF DESCRIPTION OF THE DRAWINGS

Example embodiments will be described with reference to the following drawing FIGURES in which:

FIG. 1 is a block diagram of a system provided to show several aspects of the disclosure in accordance with one embodiment of the invention.

DETAILED DESCRIPTION

In various contexts, as electronic means are increasingly used to communicate, it is becoming more important for technologies to be provided that are convenient, compatible with current devices, less costly, reliable, and easy to use. For example, with applications requiring location services, appropriate accuracy is an issue. If a mobile device user is inside a building, GPS which provides for 5-50 meter accuracy is generally not an option. In state agency sponsored participant-directed service models, it may be helpful to confirm that a given service provider employee is at a scheduled location. See, e.g., the time tracking system described in U.S. Published Application No. 2014/0279672, the content of which is hereby expressly incorporated by reference herein in its entirety. Technologies important to time tracking in this context include, for example, automated location determination, fraud prevention, and data acquisition. When determining the location of the mobile device (indicative of an employee's location at the time of data input or data submission), appropriate accuracy, battery demands, and speed are issues that need to be taken into account. Fraud prevention issues include making sure a given clock-in or clock-out submission is made when the employee is where he or she is supposed to be. Additional factors may increase the reliability of a given data acquisition transaction, including the ability to obtain and associate a contemporaneous approval indication.

In one embodiment of the disclosure, a data acquisition system is provided, which includes a mobile wireless device 10, stationary stations 12 (e.g., base stations or WiFi access points), and a time tracking system 32. The data acquisition system, in the illustrated embodiment, comprises a time tracking system used in the context of a system, for example, as disclosed in the above-referenced '672 published patent application. Thus, it can be used to support state agency sponsored participant-directed service models. Specifically, the example embodiments herein involve the submission of clock-in and clock-out times by an employee, at times with approval indications added by a participant.

One aspect of the disclosure involves an approach to use and refine location services, to determine if a given employee is where he or she is supposed to be—especially at the moment the employee enters and submits a clock-in or clock-out submission. The employee is visiting, typically caring for, a participant at a given location which may be the participant's home, the home of the participant's family member, or a care facility remote from the home. The location services accessible on the employee's mobile device (a smartphone or tablet) may be used to obtain information about whether the employee is where he or she is supposed to be (the scheduled destination, stored in a database that is part of the time tracking system) when clocking in or clocking out. However, the scheduled destination and the location determination provided by the mobile device may not be easily reconcilable. For example, the scheduled destination may be at a particular apartment in a residential building, while the location determination coincides with a different street or random location 200 meters away. Employing technologies with increased accuracy may decrease the disparity between these two locations; however, at a cost, e.g., in reduced battery life and slower time to first fix (TTFF) while not necessarily providing a more reliable indication of whether the employee is where he or she is supposed to be. Meanwhile, users of the system, at the mobile device and at the system side, are presented with ambiguous and complicated information, making it harder to use the system and the data.

Referring now the drawing in greater detail, a system may be provided as shown in FIG. 1. One or more in-range stationary stations 12 are provided, that are in range of the mobile wireless device used by the employee, and the participant when approving or verifying an entry of the employee. The stationary stations transmit signals and data that can be received by mobile unit 10 and used thereby for location determination, and may comprise BLE (Bluetooth Low Energy) beacons, LAN routers (e.g., WiFi access points), or LTE network base stations.

The in-range mobile wireless device comprises, e.g., a smartphone or tablet, and contains location resources, including a GNSS (Global Navigation Satellite Systems) location portion (e.g., GPS or assisted GPS) and a non-GNSS location portion. These location portions (depicted in FIG. 1 as location services and devices 26) may be part of the same location services chip or chipset, separate chips or chipsets, or circuitry and/or code configured to operate as part of the mobile unit. The non-GNSS location portion may employ a BLE beacon location service, a downlink OTDOA (Observed Time Difference Of Arrival) approach, enhanced cell ID, uplink UTDOA (Uplink Time Difference Of Arrival), and/or RF pattern matching.

Location storage (device storage 24 as shown in FIG. 1) is provided on the mobile device 10, holding location information. The location information may be held in accordance with a location information modeling format, such as GML (Geographic Markup Language) or NVML (Navigation Markup Language).

Location services APIs 20 (Applicant Programming Interfaces) are contained in the mobile unit 10 and configured to communicate between an application of the mobile unit (an employee time tracking application, in the illustrated embodiment) on the one hand and the local location resources 26 on the other hand. APIs 20 may also facilitate communication with external location resources 28. Devices forming part of location services and devices 26 may include, for example, a WiFi receiver, an accelerometer, and one or more radio communications modules. External location resources may include floor plans and maps, field maps of WiFi, BLE, and LTE signals, current field measurements, and comparisons of reference maps to current measurements.

The application (employee time tracking application) is configured to run on the mobile unit, and, when run, comprises a destination input configured to present a destination graphical user input on display 22 along with information (text) to thereby prompt a user to input textual information which the application receives and then uses to populate a set of geographic address fields representing a destination premises address. Those address fields may be residential address fields, e.g., street number, street, unit, city, and state. In one embodiment, the graphical user input is in accordance with an approved work schedule, and accesses destination information from a database which may be remote and part of time tracking system 32. The destination may be selected from prestored data in an approved previously provided work schedule.

The application when run further includes calls to the location services APIs, the calls including calls to cause an acquisition of a current location determination from the non-GNSS location portion of the local location resources 28. In one embodiment, there is no involvement of the GNSS location portion.

The application when run performs (among or as part of other processes) the process shown as steps 50-60 in FIG. 1. In an act 50, the destination address is obtained and converted to a destination geographic location. This is done to represent the destination with the same parameters used to represent the current location determination. Then in act 52, at clock-in or clock-out, the current location determination is acquired. At this time, two things also happen. At act 58, the application presents prompts on display 22 to obtain an approval signature and/or PIN from a participant for a given clock-in or clock-out submission. At act 54, a determination is made regarding the straight line distance between the acquired current location and the destination geographic location. If that distance is within a certain range (100 meters in one embodiment; 200 meters in another), and there is not another destination for the employee or another employee in the time tracking system that is also within range, then the process proceeds to act 56. At act 56, the current determined location is set to the destination address.

It is possible that there could be plural destination addresses in the database that are within range, for example, which could happen if there are participants in different apartments of the same building. When this happens, an indication is sent along with the current determined location to indicate that there is ambiguity, meaning that the current determined location could be one of two different destinations, one of which might not be the scheduled destination for the employee doing the time entry. Time tracking system 32 may be provided to initiate an inquiry process by which an administrator or the participant clarify whether the employee was indeed at the proper scheduled destination at the time of the time entry submission.

At act 60, the time entry submission is associated with the current determined location and with the approval data (an image file of the penned signature and/or the PIN of the participant).

The determination of the determined location is concurrent with the submission of the signature and with the entry of the time (clock-in or clock-out). In one embodiment, these all occur within a window of 1 second.

The signature of the approver (a participant) is obtained by capturing with a stylus or finger tip creating a signature image within an area of an interactive screen of display 22. In one embodiment, a designed signature area (e.g., box) is shown on display 22 within which the participant can create the signature.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Apparatus comprising:
  one or more in-range stationary stations configured to transmit a signal received by an in-range mobile unit;

the in-range mobile unit containing local location resources, including a GNSS (Global Navigation Satellite Systems) location portion and a non-GNSS location portion;

location storage on the in-range mobile unit holding location information in accordance with a location information modeling format;

location services APIs (Application Programming Interfaces) contained in the in-range mobile unit and configured to communicate between an application on the mobile unit on the one hand and the local location resources on the other hand;

the application configured to be run on the in-range mobile unit, and, when run, comprising a destination input configured to present a destination graphical user input on a display screen of the in-range mobile unit along with information to thereby prompt a user to input textual information which the application receives and then uses to populate a set of geographic address fields representing a destination premises address;

the application when run further including calls to the location services APIs, the calls including calls to cause an acquisition of a current location determination from the non-GNSS location portion of the local location resources;

the application when run converting the destination premises address to a destination geographic location using the same parameters used to represent the current location determination; and the application when run providing an indication, to the in-range mobile unit's user via the unit's visual display, of the current determined location of the in-range mobile unit in terms of a premises address, the current determined location being set to the destination premises address when a straight line distance between the destination geographic location and the acquired current location determination is less than a prescribed value.

2. The apparatus according to claim 1, wherein the stationary stations are LAN routers.

3. The apparatus according to claim 1, wherein the stationary stations are WiFi stations.

4. The apparatus according to claim 1, wherein the stationary stations are BLE (Bluetooth Low Energy) beacons.

5. The apparatus according to claim 1, wherein the stationary stations are LTE network base stations.

6. The apparatus according to claim 1, wherein the GNSS location portion comprises a GPS or assisted GPS portion.

7. The apparatus according to claim 1, wherein the non-GNSS portion comprises a BLE beacon location service.

8. The apparatus according to claim 1, wherein the non-GNSS portion comprises a downline OTDOA location service.

9. The apparatus according to claim 1, wherein the non-GNSS portion comprises an enhanced cell ID location service.

10. The apparatus according to claim 1, wherein the non-GNSS portion comprises an uplink UTDOA location service.

11. The apparatus according to claim 1, wherein the non-GNSS portion comprises an RF pattern matching location service.

12. The apparatus according to claim 1, wherein the location storage comprises internal memory.

13. The apparatus according to claim 1, wherein the location storage comprises external memory.

14. The apparatus according to claim 1, wherein the location information modeling format comprises GML (Geographic Markup Language).

15. The apparatus according to claim 1, wherein the location information modeling format comprises NVML (Navigation Markup Language).

16. The apparatus according to claim 1, wherein the mobile unit comprises a smartphone.

17. The apparatus according to claim 1, wherein the mobile unit comprises a tablet.

18. The apparatus according to claim 1, wherein the APIs are also configured to communicate between the application and external location resources.

19. The apparatus according to claim 1, wherein the information presented on the destination graphical user input includes text.

20. The apparatus according to claim 19, wherein the fields representing the destination premises address include street number, street, unit, city, and state.

21. The apparatus according to claim 20, wherein the destination graphical user input is in accordance with an approved work schedule.

22. The apparatus according to claim 21, wherein the destination graphical user input is selected from prestored data in an approved previously-provided work schedule.

23. The apparatus according to claim 1, wherein the current location determination indicates a location in two dimensions in terms of longitude and latitude.

24. The apparatus according to claim 23, wherein the current location determination did not involve the GNSS location portion.

25. The apparatus according to claim 24, wherein the destination geographic location parameters include longitude and latitude.

26. The apparatus according to claim 25, wherein the indication of the location of the in-range mobile unit is represented as street number, street, unit, city, and state.

27. The apparatus according to claim 1, the application when run further sending the indicated determined location and a time of the determination to a remote time reporting system.

28. The apparatus according to claim 27, wherein the determination of the determined location is concurrent with submission of an approval signature.

29. The apparatus according to claim 28, wherein the determination is concurrent with submission of an approval signature, when the determination is made within 1 second of the submission of an approval signature.

30. The apparatus according to claim 29, wherein the application when run is configured to capture a stylus or finger tip created signature image within an area on an interactive screen of the in-range mobile unit.

31. The apparatus according to claim 30, wherein the area is designated by a perimeter on the interactive screen.

32. The apparatus according to claim 30, wherein the application is configured to send clock-in information included with the determined location determined at the clock-in time, along with a file of a contemporaneously captured signature.

33. The apparatus according to claim 32, wherein a PIN of the approving person is also associated and included with the determined location, the clock-in information, and the captured signature.

* * * * *